United States Patent
Rischmuller et al.

(10) Patent No.: US 9,563,200 B2
(45) Date of Patent: Feb. 7, 2017

(54) METHOD FOR PILOTING A ROTARY WING DRONE FOR TAKING AN EXPOSURE THROUGH AN ONBOARD CAMERA WITH MINIMIZATION OF THE DISTURBING MOVEMENTS

(71) Applicant: PARROT, Paris (FR)

(72) Inventors: Michael Rischmuller, Aix-en-Provence (FR); Francois Callou, Paris (FR)

(73) Assignee: PARROT, Paris (FR)

( * ) Notice: Subject to any disclaimer, the term of this patent is extended or adjusted under 35 U.S.C. 154(b) by 390 days.

(21) Appl. No.: 13/733,386

(22) Filed: Jan. 3, 2013

(65) Prior Publication Data

US 2013/0176423 A1 Jul. 11, 2013

(30) Foreign Application Priority Data

Jan. 5, 2012 (FR) ...................... 12 50112

(51) Int. Cl.
*G05D 1/00* (2006.01)
*A63H 30/04* (2006.01)
(Continued)

(52) U.S. Cl.
CPC .......... *G05D 1/0038* (2013.01); *A63H 27/12* (2013.01); *A63H 30/04* (2013.01); *G05D 1/0094* (2013.01);
(Continued)

(58) Field of Classification Search
CPC ....... A63H 27/12; A63H 30/04; G05D 1/0858
(Continued)

(56) References Cited

U.S. PATENT DOCUMENTS

| 6,813,559 B1 * | 11/2004 | Bodin | G05D 1/0202 244/75.1 |
| 8,214,088 B2 * | 7/2012 | Lefebure | A63H 27/12 244/189 |

(Continued)

FOREIGN PATENT DOCUMENTS

| WO | 2010/061099 A2 | 6/2010 |
| WO | 2010/100436 A2 | 9/2010 |

OTHER PUBLICATIONS

Gillula (Design of Guaranteed Safe Maneuvers Using Reachable Sets: Autonomous Quadrotor Aerobatics in Theory and Practice; 2010 IEEE International Conference on Robotics and Automation Anchorage Convention District May 3-8, 2010, Anchorage, Alaska, USA) and in further view of Zhu (U.S. 20120095621).*

(Continued)

*Primary Examiner* — William C Vaughn, Jr.
*Assistant Examiner* — Jerry Jean Baptiste
(74) *Attorney, Agent, or Firm* — Haverstock & Owens LLP

(57) ABSTRACT

The drone (10) comprises an onboard video camera (14) picking up a sequence of images to be transmitted to a remote control. The user selects an exposure mode such as forward or sideways, panoramic or boom plane, tracking, defining a trajectory to be transmitted to the drone. Corresponding setpoint values are generated and applied to a processing subsystem controlling the motors of the drone. Once the drone is stabilized on the prescribed trajectory (38), the exposure by the video camera (14) is activated and the trajectory is stabilized by an open loop control avoiding the oscillations inherent in a servocontrol with feedback loop.

11 Claims, 7 Drawing Sheets

(Tracking)

(51) Int. Cl.
*H04N 5/232* (2006.01)
*A63H 27/00* (2006.01)

(52) U.S. Cl.
CPC ...... *H04N 5/23216* (2013.01); *H04N 5/23245* (2013.01); *H04N 5/23248* (2013.01)

(58) Field of Classification Search
USPC .......................................................... 701/11
See application file for complete search history.

(56) References Cited

U.S. PATENT DOCUMENTS

| | | | |
|---|---|---|---|
| 2009/0157233 A1 | 6/2009 | Kokkeby | |
| 2011/0049290 A1* | 3/2011 | Seydoux | ................ A63H 27/12 244/17.13 |
| 2012/0095621 A1* | 4/2012 | Zhu | ........................ G05D 1/101 701/3 |

OTHER PUBLICATIONS

Gillula (Design of Guaranteed Safe Maneuvers Using Reachable Sets: Autonomous Quadrotor Aerobatics in Theory and Practice; 2010 IEEE International Conference on Robotics and Automation Anchorage Convention District May 3-8, 2010, Anchorage, Alaska, USA).*

Jeffrey Saunders et al., "Tracking a Target in Wind Using a Micro Air Vehicle with a Fixed Angle Camera", American Control Conference, 2008, IEEE, Piscataway, NJ, USA, Jun. 11, 2008, pp. 3863-3868.

* cited by examiner

Fig. 10 (Tracking)

(Panoramic)

(Boom plane)

METHOD FOR PILOTING A ROTARY WING DRONE FOR TAKING AN EXPOSURE THROUGH AN ONBOARD CAMERA WITH MINIMIZATION OF THE DISTURBING MOVEMENTS

The invention relates to rotary wing drones such as quadricopters and similar.

These drones are provided with multiple rotors driven by respective motors that can be controlled in a differentiated manner to pilot the drone attitude-wise and speed-wise.

A typical example of such a drone is the AR.Drone from Parrot SA, Paris, France, which is a quadricopter equipped with a series of sensors (accelerometers, triaxial gyrometers, altimeter), a front-mounted camera picking up an image of the scene toward which the drone is directed, as well as a vertical sight camera picking up an image of the terrain being flown over.

This drone is piloted by the user by means of a separate remote control device—hereinafter called "apparatus"—linked to the drone by a radio link. WO 2010/061099 A2 and EP 2 364 757 A1 (Parrot SA) describe such a drone and its principle of piloting via a telephone or portable multimedia device with touchscreen and integrated accelerometer, for example a cellular telephone of iPhone type or a portable device or multimedia tablet of iPod Touch or iPad type (registered trademarks of Apple Inc., USA). These apparatuses incorporate the various control members necessary to the detection of the piloting commands and bidirectional exchange of data with the drone via a wireless link of Wi-Fi (IEEE 802.11) or Bluetooth (registered trademarks) local area network type. They are furthermore provided with a touchscreen displaying the image picked up by the front-mounted camera of the drone, with, superimposed, a certain number of symbols making it possible to activate commands by simple finger-contact by the user on this touchscreen.

More specifically, the drone is piloted by the user by means of signals transmitted by the detector of inclinations of the apparatus, inclinations which will be replicated by the drone: for example, to move the drone forward, the user inclines his or her apparatus according to its pitch axis, and to offset the drone to the right or left, he or she inclines this same apparatus relative to its roll axis. In this way, if the drone is controlled in such a way as to be inclined or "dive" downward (inclination according to pitch angle), it will move forward with a speed that increases as the inclination increases; conversely, if it is controlled in such a way as to "pull up" in the opposite direction, its speed will slow down progressively then will be reversed by starting to move backward. Similarly, for an inclination command according to a roll axis, the drone will lean to the right or left, provoking a linear horizontal translational displacement to the right or to the left.

The user has other commands displayed on the touchscreen, notably "climb/descend" (throttle control) and "pivot right/pivot left" (pivoting of the drone about its yaw axis).

The drone is also provided with a fixed point passage command: when the user releases all the commands of his remote control apparatus, the drone is immobilized at the fixed point and is stabilized there entirely automatically.

The video camera of the drone can be used not only for the piloting in "immersive mode" (that is to say where the user uses the image from the onboard camera in the same way as if he himself were onboard the drone), but also to pick up sequences of images of a scene toward which a drone is directed. The user can thus use the camera of the drone in the same way as a camera or a camcorder which, instead of being held in the hand, would be borne by the drone.

However, in its flight, the drone is subject to numerous stray movements which will provoke unwanted oscillations and jumps in the image picked up by the camera.

In particular, with the camera which points in the main direction of the drone (direction corresponding to the roll axis), any movement about the pitch axis (at right angles to the axis of the camera) will produce on the image vertical oscillations greatly degrading the legibility and the quality of the image picked up. Now, as has been explained above, the displacements of the drone, whether they are controlled by the user or servocontrolled by the automatic pilot, result mainly from tilting movements about the pitch (forward/back displacement) and roll (left/right displacement) axes, which are inherent to the very principle of operation of a drone of quadricopter type.

Numerous image stabilization techniques are of course known, but these techniques are unfortunately not applicable to the particular case described here:

inasmuch as the drone is a flying object which is not linked to a support, the mechanical stabilization systems with arms and counterweights shifting the center of gravity of the camera at the level of a universal joint (steadicam technique) cannot be used;

nor can the stabilization by real-time displacement of optical elements of the lens, or of the sensor in the focal plane, which are techniques commonly applied to photography, be considered given the choice for the camera of an integrated miniature component, for reasons of weight and of bulk;

finally, the post-processing of the video image, with or without the use of gyroscopic data collected during the flight, would require relatively great computation resources, incompatible with the capacity of the microcomputer carried by the drone, and would introduce a not inconsiderable latency time prohibiting an effective control of the drone in real time.

The problem of the invention is to find another stabilization technique which makes it possible to produce a sequence of video images with as little as possible of the undesirable movements reflected in the image.

The basic idea of the invention consists in adapting the control of the motors of the drone so as to minimize the stray movements of the camera. For this, the user chooses a particular exposure mode (tracking, panoramic, etc), which automatically defines for the drone a preselected corresponding trajectory, adapted in such a way as to minimize the stray oscillations, with appropriate modification of the servocontrols of the drone according to the chosen exposure mode. The drone then switches to a stabilized autopiloting mode controlling its movements in space. The exposure by the video camera can then be activated, the control of the autopilot being adapted by itself to the constraints of the stabilized video. More specifically, the subject of the invention is a method for piloting, by means of a remote control apparatus, a rotary wing drone with multiple rotors driven by respective motors that can be controlled in a differentiated manner to pilot the drone attitude-wise and speed-wise. The drone comprises an onboard video camera suitable for picking up a sequence of images of a target seen from the drone and for transmitting this sequence to the apparatus.

Characteristically, this method comprises the following steps:

selection by the user of a predetermined exposure mode, defined by a set of parameters describing a trajectory to be transmitted to the drone, these parameters belonging to the group comprising: exposure mode at a fixed point or in displacement; type of displacement, translational or rotational; speed of displacement; direction or axis of displacement; direction of displacement; duration of displacement; exposure altitude;

generation of setpoint values from said set of parameters, and application of these setpoints to a processing subsystem for controlling the motors of the drone;

once the drone is stabilized on a trajectory conforming to said parameters, activation of the exposure by the video camera.

The first possible exposure mode is a fixed point mode. In this case, the set of parameters is suitable for describing a trajectory at a zero displacement speed in rotation and in translation.

The second possible exposure mode is a forward or sideways tracking mode.

In this case, the set of parameters is suitable for describing a translational trajectory with constant speed of displacement along a horizontal direction, this horizontal direction being parallel to the axis of the camera for a forward tracking and at right angles to the axis of the camera for a sideways tracking, the trajectory being oriented toward the front or rear for a forward tracking, and toward the left or toward the right for a sideways tracking.

The setpoint values can notably be generated in the form of angular setpoints according to a pitch angle of the drone for a forward tracking, or according to a roll angle of the drone for a sideways tracking, these angular setpoints being applied:

during a transitional phase: to the processing subsystem configured in a horizontal speed servocontrol closed loop suitable for enabling the drone to reach said parameterized displacement speed, then once the displacement speed is reached: to the processing subsystem configured in a horizontal speed control open loop, with deactivation of said servocontrol closed loop.

Advantageously, the generation of setpoints comprises the generation of additional setpoints representative of a horizontal speed compensating the component of the wind in the direction of displacement of the drone. These additional setpoints can be fixed at a constant value when the horizontal speed servocontrol error passes below a predetermined threshold.

The third possible exposure mode is a panoramic mode.

In this case, the set of parameters is suitable for describing a rotational trajectory, in one direction or in the other, about a vertical axis at right angles to the exposure axis of the camera.

In a first implementation, suitable for a simple video panoramic effect, the vertical axis is the yaw axis of the drone, and the setpoint values comprise zero pitch and roll angle setpoints.

In particular, the setpoint values generated comprise a constant yaw setpoint specifically for generating a continuous rotation about said vertical axis, and applied to the processing subsystem configured in an angular servocontrol closed loop, the pitch and roll angle setpoints being applied to the processing subsystem with deactivation of the horizontal speed servocontrol closed loop.

In a second implementation, suitable for producing a panorama produced by assembling successive fixed images, the vertical axis is a vertical axis passing through the input aperture of the camera, and the setpoint values comprise pitch and roll angle setpoints specifically for generating a movement along a circular trajectory extending in a horizontal plane and centered on the input aperture of the camera.

In particular, the setpoint values generated comprise a yaw setpoint specifically for generating a rotation by successive steps about said vertical axis, between angularly offset fixed points defined by a heading reference incremented after each exposure, and applied to the processing subsystem configured in an angular servocontrol closed loop.

The fourth possible exposure mode is a boom plane mode.

In this case, the set of parameters is suitable for describing a translational trajectory at constant speed, in one direction or in the other, along a direction forming an angle with the plane of the horizontal.

The setpoint values can notably be applied:

during a transitional phase: to the processing subsystem configured in a speed servocontrol closed loop, suitable for enabling the drone to reach the speed of displacement and follow said direction of displacement by generation of angular setpoints according to pitch and roll angles of the drone, then once the speed of displacement and the direction of displacement have been reached: to the processing subsystem configured in a speed control open loop, with deactivation of said servocontrol closed loop.

In all the exposure modes, the method can advantageously also comprise the application by the user of trajectory correction commands, superimposed on said setpoint values generated from said set of parameters.

There now follows a description of an exemplary implementation of the device of the invention, with reference to the appended drawings in which the same numeric references designate, from one figure to another, identical or functionally similar elements.

There now follows a description of an exemplary implementation of the invention.

Figure 1:
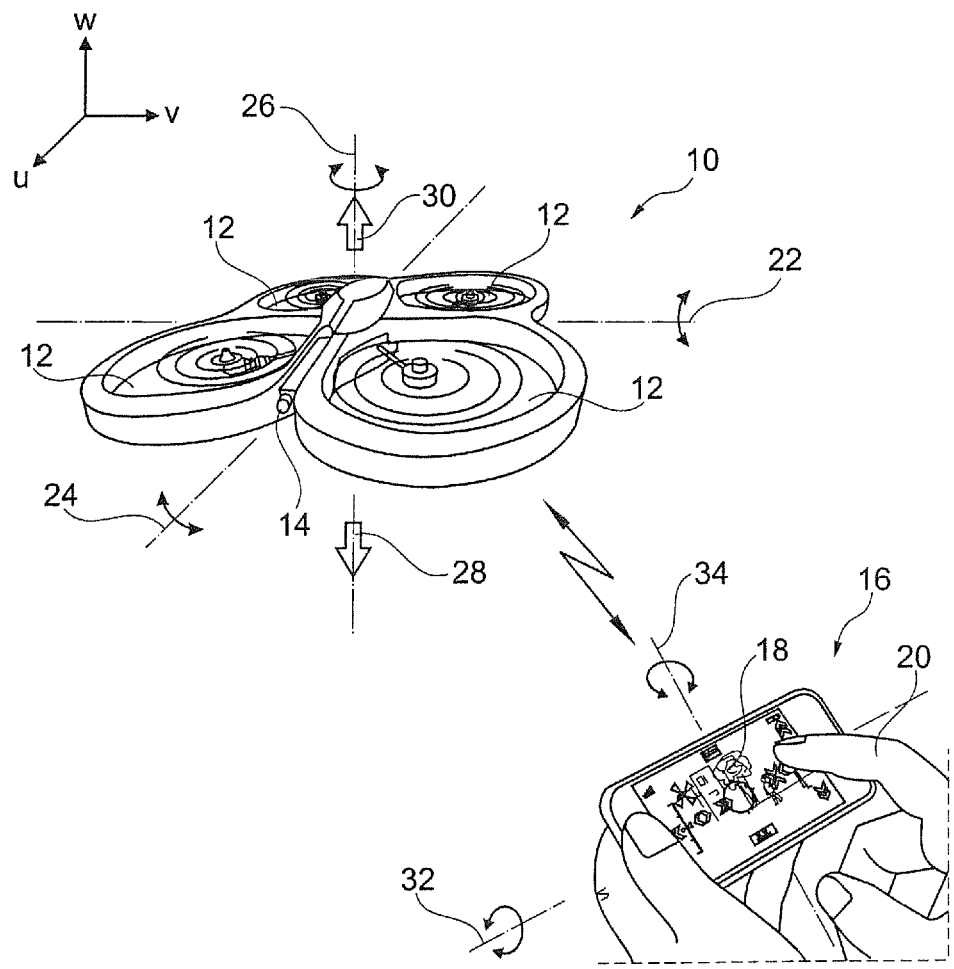
FIG. 1 is an overall view showing the drone and the associated remote control apparatus that can be used to pilot the drone remotely.

In FIG. 1, the reference 10 generally designates a drone, which is, for example, a quadricopter such as the model AR.Drone from Parrot SA, Paris, France, described notably in WO 2010/061099 A2 and EP 2 364 757 A1 mentioned above, and in WO 2009/109711 A2 (which describes an exemplary system for automatic stabilization based on information supplied by an altimeter and a front-viewing camera) and FR 2 915 569 A1 (which notably describes the control system with gyrometers and accelerometers used by the drone).

The drone 10 comprises four coplanar rotors 12, the motors of which are piloted independently by an integrated navigation and attitude control system. It is provided with a first, front-viewing camera 14 making it possible to obtain an image of the scene toward which the drone is oriented, for example a wide-angle camera with CMOS sensor.

The drone also comprises a second, vertical-viewing camera (not represented) pointing downward, suitable for picking up successive images of the terrain being flown over and used notably to evaluate the speed of the drone in relation to the ground. Inertial sensors (accelerometers and gyrometers) make it possible to measure, with a certain accuracy, the angular speeds and the attitude angles of the drone, that is to say the Euler angles describing the inclination of the drone.

Generally, the term "inclination" will be understood to mean the inclination of the drone in relation to a horizontal plane of a fixed terrestrial reference frame, it being understood that the two longitudinal and transversal components of the horizontal speed are intimately linked to the inclination along the two respective pitch and roll axes.

An ultrasound rangefinder arranged under the drone moreover supplies a measurement of the altitude in relation to the ground.

With regard to the linear speed of translation of the drone, the latter is evaluated by analysis of the image supplied by the vertical-viewing camera of the drone in combination with the accelerometric data, by virtue of software which estimates the displacement of the scene picked up by the camera from one image to the next and applies to this estimated displacement a scale factor that is a function of the measured altitude.

The drone 10 is piloted by a remote control apparatus 16 provided with a touchscreen 18 displaying the image embedded by the front-mounted camera 14, with, superimposed, a certain number of symbols making it possible to activate piloting commands by simple contact of the finger 20 of a user on the touchscreen 18. The apparatus 16 is provided with radio link means with the drone for the bidirectional exchange of data from the drone 10 to the apparatus 16, notably for the transmission of the image picked up by the camera 14, and from the apparatus 16 to the drone 10 for the sending of piloting commands. This link can, for example, be of Wi-Fi (IEEE 802.11) or Bluetooth (registered trademarks) local area network type.

The apparatus 16 is also provided with inclination sensors making it possible to control the attitude of the drone by transmitting to the apparatus corresponding inclinations according to the roll and pitch axes (reference can be made to WO 2010/061099 A2 mentioned above for more details on these aspects of the system).

As indicated in the introduction, the remote control apparatus 16 advantageously consists of a telephone or portable multimedia device with touchscreen and integrated accelerometer, for example a cellular telephone of iPhone type, a portable device of iPod Touch type or a multimedia tablet of iPad type, which are apparatuses that incorporate the various control members necessary to the display and the detection of the piloting commands, to the viewing of the image picked up by the front-mounted camera, and to the bidirectional exchange of data with the drone via Wi-Fi or Bluetooth link.

The piloting of the drone 10 consists in moving the latter by:

a) rotation about a pitch axis 22, to have it move forward or back; and/or b) rotation about a roll axis 24, to shift it to the right or to the left; and/or c) rotation about a yaw axis 26, to have the main axis of the drone—and therefore also the direction of pointing of the front-mounted camera 14—pivot to the right or to the left; and/or d) translation downward 28 or upward 30 by change of throttle speed, so as respectively to reduce or increase the altitude of the drone.

When these piloting commands are applied by the user from the remote control apparatus 16, the commands a) and b) for pivoting about the pitch 22 and roll 24 axes are obtained by inclinations of the apparatus 16 respectively about its longitudinal axis 32 and its transversal axis 34: for example, to have the drone move forward, it is sufficient to incline the apparatus forward by tilting it about the axis 32, to shift it to the right, it is sufficient to incline the apparatus by tilting it about the axis 34 to the right, and so on.

For their part, the commands c) and d) result from actions applied by contact of the finger 20 of the user (generally the right finger) on corresponding specific areas of the touchscreen 18.

The drone also has an automatic and standalone system for stabilization in stationary flight, activated notably as soon as the user removes his finger from the touchscreen of the apparatus, or automatically at the end of the take-off phase, or even in case of interruption of the radio link between the apparatus and the drone. The drone then switches to a lift state in which it will be immobilized and stabilized automatically in this fixed position, without any intervention from the user.

There now follows an explanation of how the piloting setpoints for the motors of the drone are generated to make it possible to take exposures by means of the front-mounted camera 14 with a minimum of disturbing movements likely to interfere with the image picked up.

Figures 4, 5:
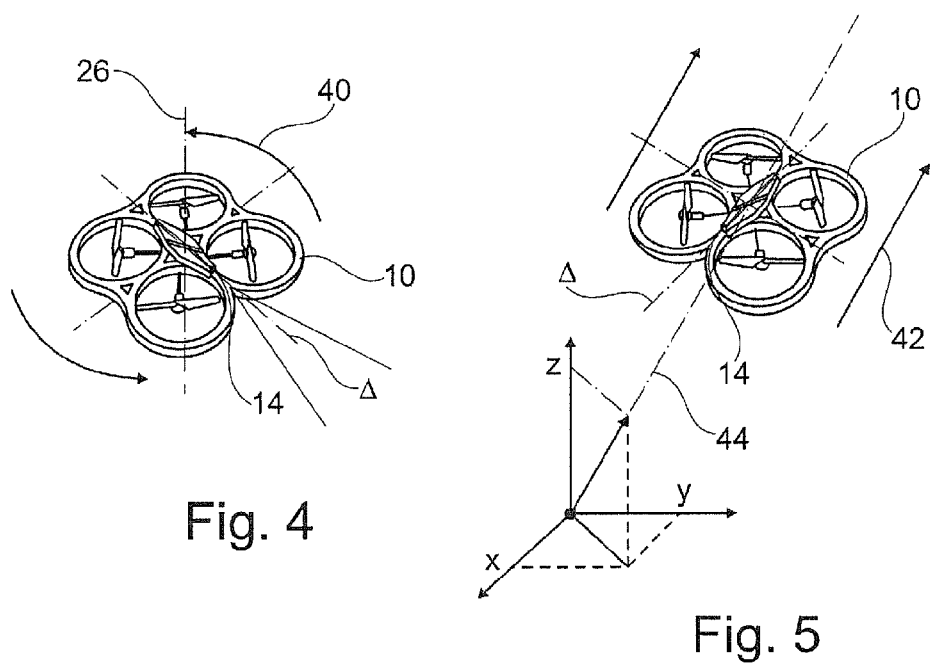
FIG. 4 is an illustration schematically representing the movement to be transmitted to the drone to produce an exposure in panoramic mode.
FIG. 5 is an illustration schematically representing the movement to be transmitted to the drone to produce an exposure in boom plane mode.
Figure 7:
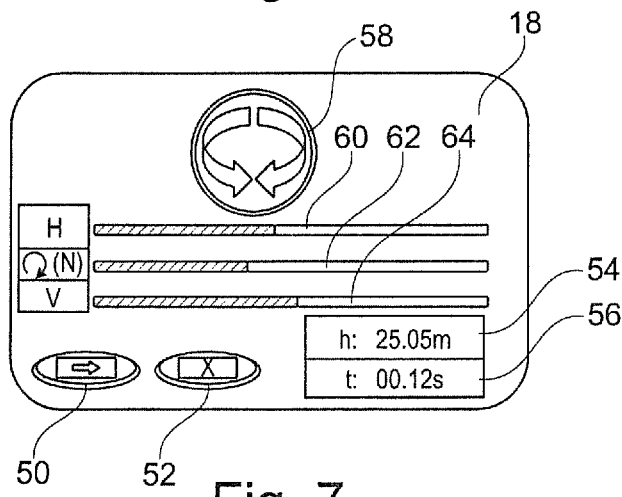
FIG. 7 shows an example of commands presented to the user on the screen of the device for an exposure in panoramic mode.
Figure 8:
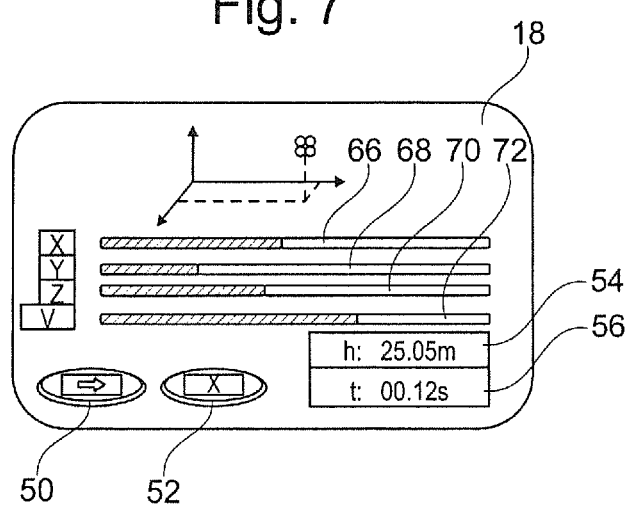
FIG. 8 shows an example of commands presented to the user on the screen of the device for an exposure in boom plane mode.
Figure 11:
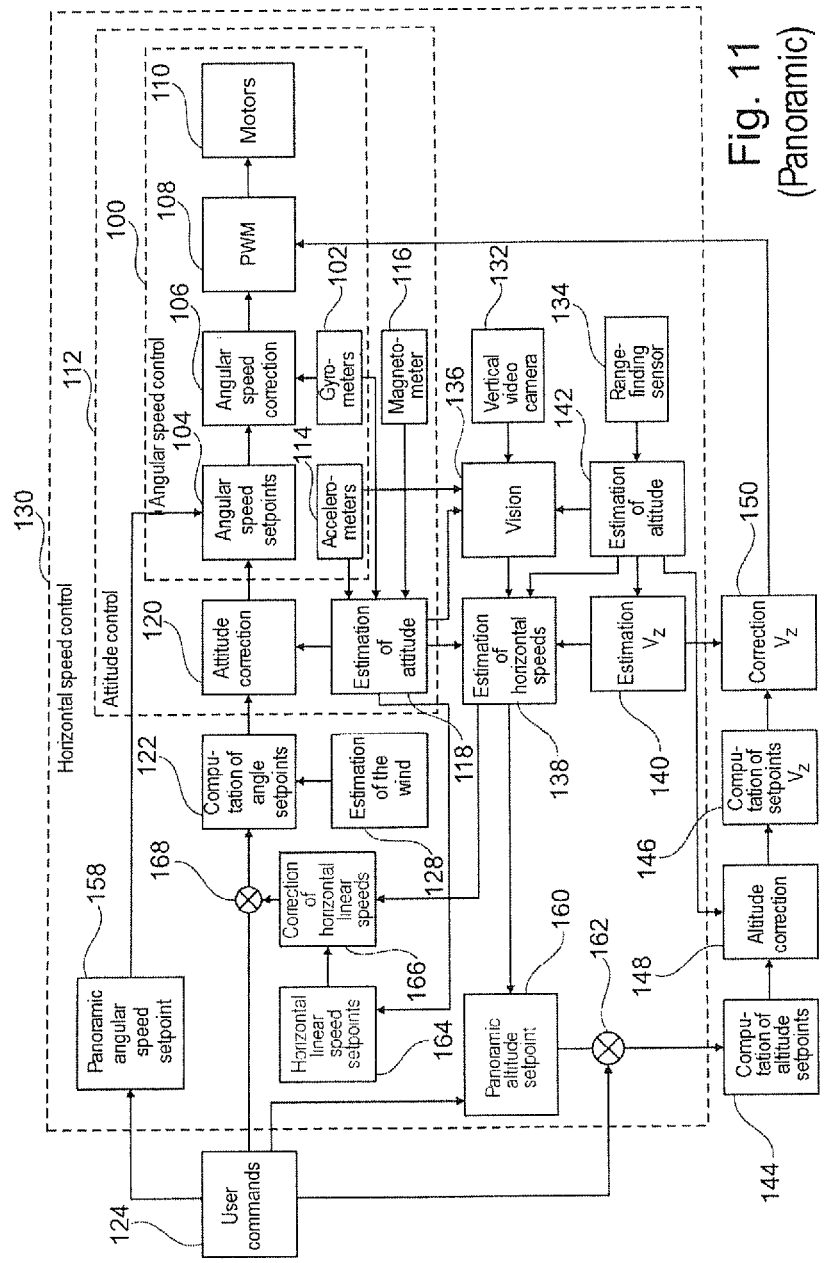
FIG. 11 is a diagram corresponding to that of FIG. 9, modified for an autopiloting configuration in panoramic mode.
Figure 12:
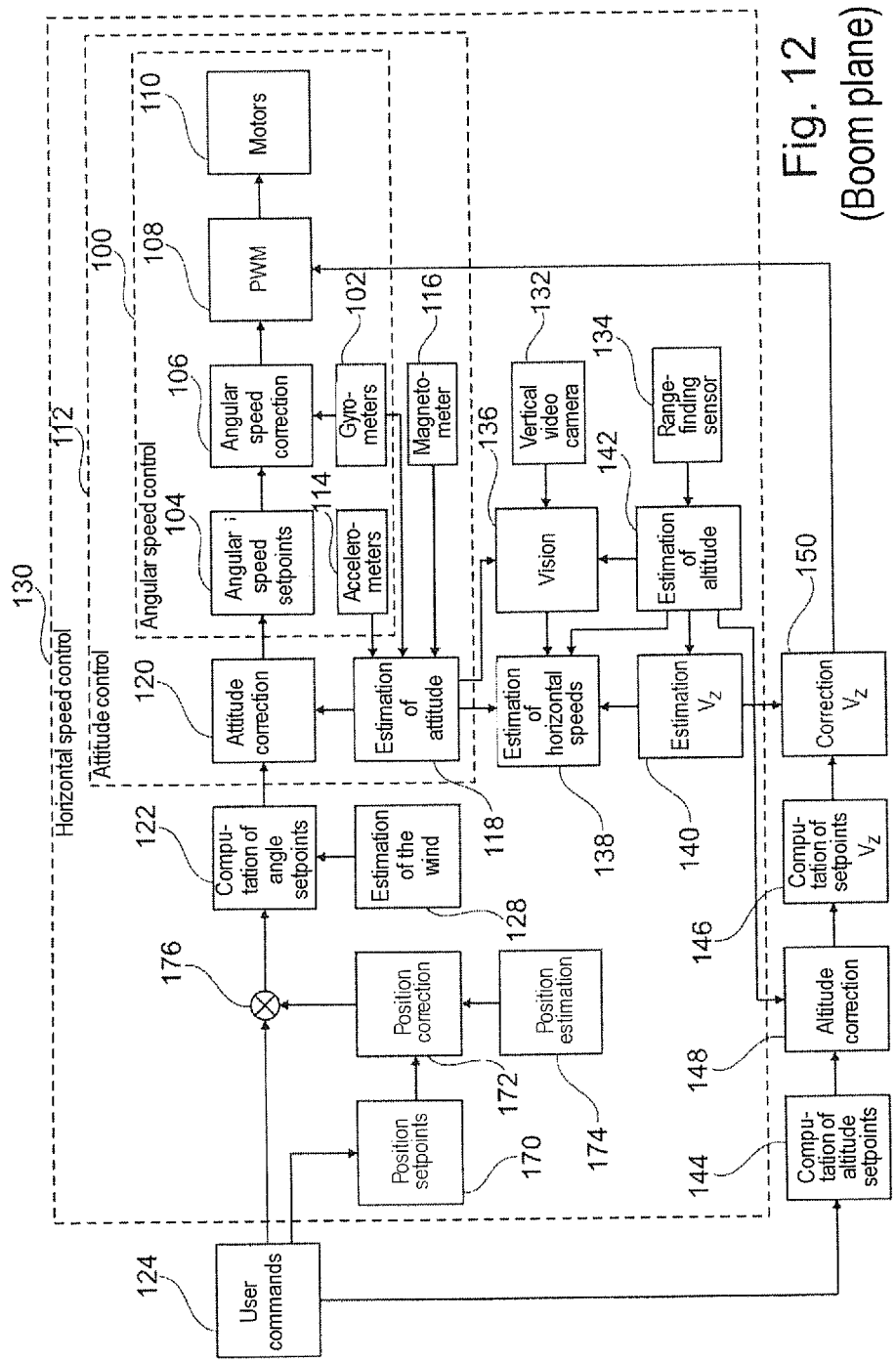
FIG. 12 is a diagram corresponding to that of FIG. 9, modified for an autopiloting configuration in boom plane mode.

The example of three typical exposure modes will be described, namely:

tracking, with reference more particularly to FIGS. 2, 3, 6 and 10 (the "fixed plane" mode being able to be considered as a particular case of the tracking mode, with a zero displacement speed);

panoramic, with reference more particularly to FIGS. 4, 7 and 11;

boom plane, with reference more particularly to FIGS. 5, 8 and 12.

Figures 2, 3:
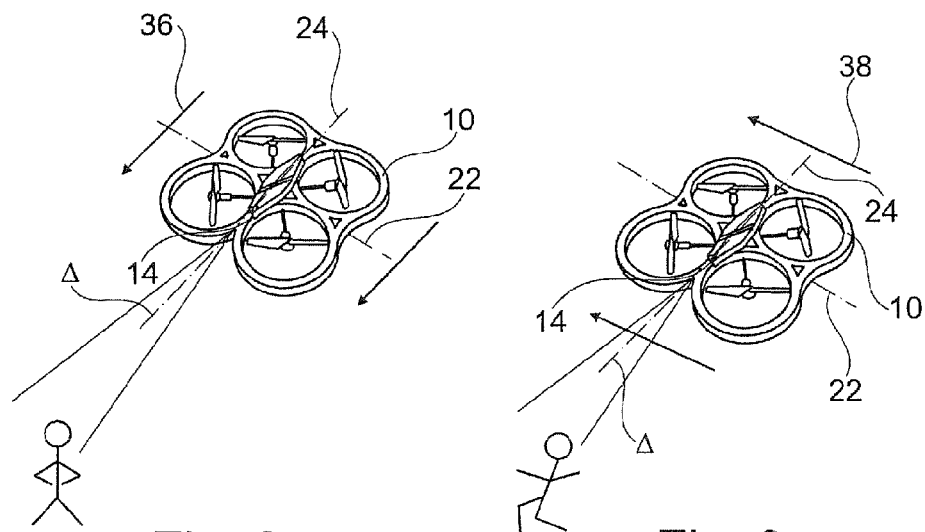
FIG. 2 is an illustration schematically representing the movement to be transmitted to the drone to produce an exposure in forward tracking mode.
FIG. 3 is an illustration schematically representing the movement to be transmitted to the drone to produce an exposure in sideways tracking mode.

FIGS. 2 and 3 schematically illustrate the movement to be transmitted to the drone to produce an exposure in tracking mode, respectively for a forward tracking and for a sideways tracking.

The tracking is characterized by a camera movement with constant horizontal speed, parallel to the ground.

When this speed is zero, the tracking is reduced to an exposure in fixed plane mode: it is then sufficient for the user to select this "fixed plane" mode and possibly the duration of the fixed plane, the altitude and the direction of the camera. The automatic pilot then estimates the wind (see below), computes the average angle for fighting against the wind and, when the exposure is triggered, the automatic pilot applies this angle to the setpoints of the drone.

For a forward tracking, where the aim is to give the impression of moving closer to or further away from a target of the scene being picked up, for example a person, the horizontal displacement is done according to the main axis Δ of the camera, that is to say in this case along the roll axis 24. This situation is illustrated in FIG. 2, in the case of a forward tracking, indicated by the movement of the arrow 36 (for a backward tracking movement, the displacement would take place along the same line but in the opposite direction, to produce an effect of moving away from the person situated in the field of the camera).

In the case of a sideways tracking, the movement is applied along a horizontal axis at right angles to the axis Δ of the camera, that is to say in this case along the pitch axis 22 of the drone. This involves, for example, following a person walking or running keeping the person in the frame of the image, in side view.

This situation is illustrated in FIG. 3, in the case of a sideways tracking to the right, indicated by the movement of the arrow 36 (for a left sideways tracking, the movement would be along the same line, but in the opposite direction).

A second possible exposure mode, the panoramic mode, is illustrated in FIG. 4.

This exposure mode is characterized by a movement of the camera about a vertical axis, in this case the yaw axis 26 of the drone (or, as a variant, a vertical axis passing through the input aperture of the camera, therefore off-center in relation to the yaw axis of the drone). This movement, schematically represented by the arrow 40, is performed at constant rotation speed, in one direction or in the other, at a relatively low speed in relation to the pivoting speeds commonly used to move the drone in a controlled piloting phase. It will also be noted that this rotation must be performed with the drone flat, that is to say that the axis Δ of the camera (corresponding to the roll axis 24 of the drone) must scan a horizontal plane parallel to the ground, that is to say with the drone at constant altitude. In concrete terms, the user is allowed the possibility to start the panoramic exposure at the current altitude of the drone, or else to give a setpoint altitude that the drone must reach before beginning the panoramic exposure.

A third possible exposure mode offered to the user is a so-called "boom plane" mode. This involves giving the illusion of a camera attached to the end of a boom and to which is imparted a movement away from the target according to the three axes of the space. The corresponding movement 42, illustrated in FIG. 5, is defined by the three coordinates X, Y, Z of a vector 44 defining the direction of moving away and by the (constant) speed of this moving away.

Figure 6:
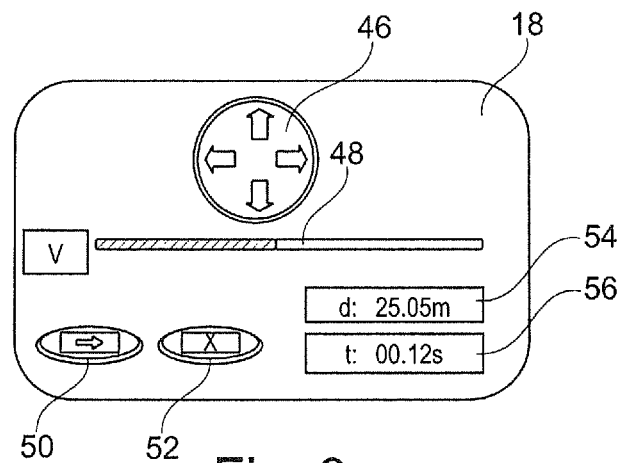
FIG. 6 shows an example of commands presented to the user on the screen of the device for an exposure in tracking mode.

FIGS. 6 to 8 give examples of commands presented to the user on the screen 18 of the remote control device 16 to parameterize the various exposure modes that are available to him.

These commands may be touch commands of button, cursor or similar type, in themselves well known.

FIG. 6 illustrates the screen for parameterizing the tracking mode. A button 46 makes it possible to select the tracking type: forward, backward, right sideways, left sideways, and a cursor 48 makes it possible to define the constant speed of this tracking (this speed may be zero, the tracking then being reduced to an exposure in fixed plane mode). Buttons 50 and 52 respectively make it possible to trigger and stop the exposure in tracking mode, and windows 54 and 56 indicate, during execution, the distance traveled and the time elapsed since the start of the exposure.

FIG. 7 illustrates the screen for parameterizing the panoramic mode. A button 58 makes it possible to define the direction, clockwise or counterclockwise, of rotation, and cursors 60, 62 and 64 make it possible to define respectively a setpoint altitude for the execution of the panoramic exposure, the number of revolutions or fractions of revolution of the exposure, and the angular speed of rotation. The buttons 50 and 52 are used, as in the preceding case, to trigger and stop the exposure, whereas the windows 54 and 56 respectively display the current altitude of the drone and the time elapsed since the start of the exposure.

FIG. 8 is an example of a screen for parameterizing the boom plane mode. The latter comprises three cursors 66, 68, 70 defining the coordinates X, Y, Z of the vector defining the direction of moving away, or else the coordinates of a target point to be reached. Another cursor 72 defines the speed of the movement away. The buttons 50 and 52 are used, as in the preceding case, to trigger and stop the exposure, whereas the windows 54 and 56 respectively display the current altitude of the drone and the time elapsed since the start of the exposure.

Various other commands can be added to those that have just been described, for example a command setting a priori the duration of the exposure and therefore of the controlled displacement.

Controlling the Speeds and the Attitude of the Drone

There now follows an explanation of how these trajectories are executed by the system of the invention.

Figure 9:
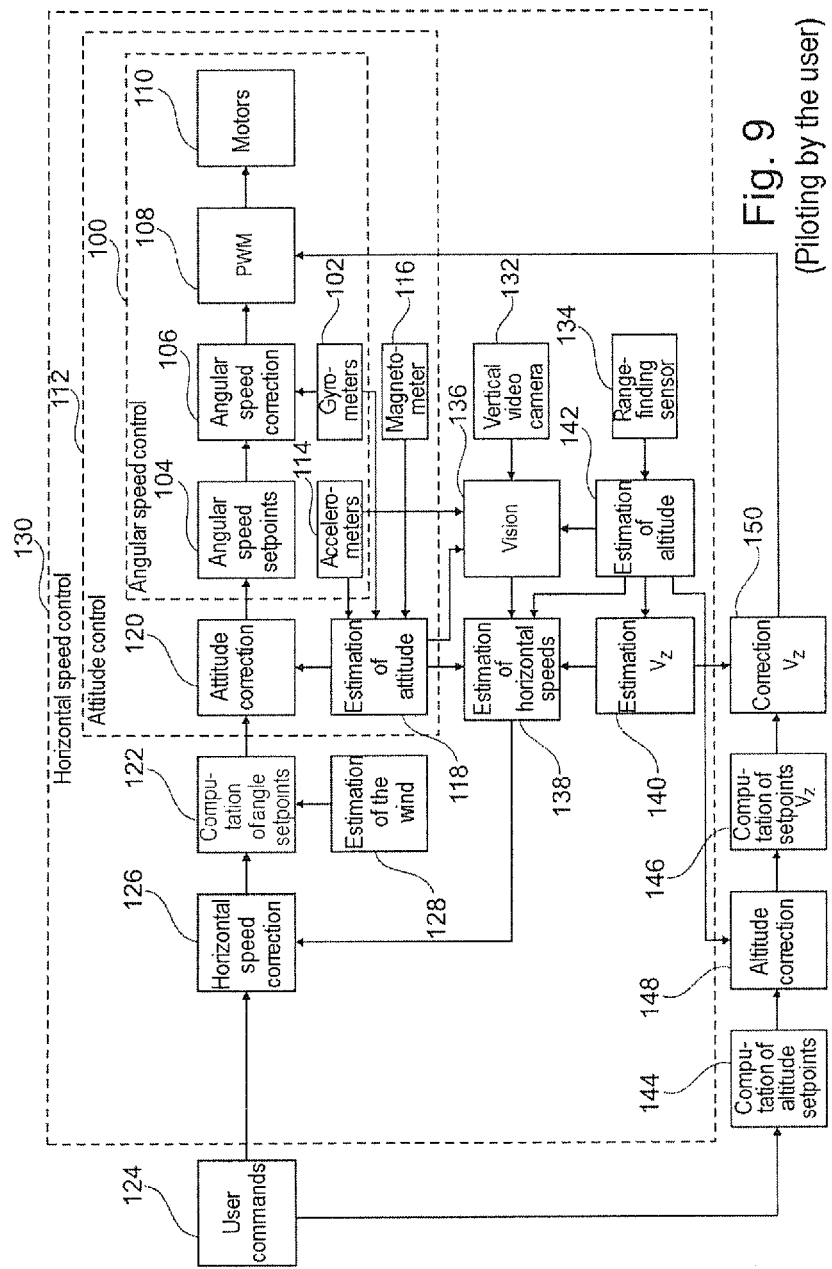
FIG. 9 is a block diagram of the different control, servocontrol and assisted piloting members of the drone in a conventional servocontrol piloting configuration.

FIG. 9 is a functional block diagram of the different control and servocontrol members of the drone, in a configuration allowing for conventional piloting.

Figure 10:
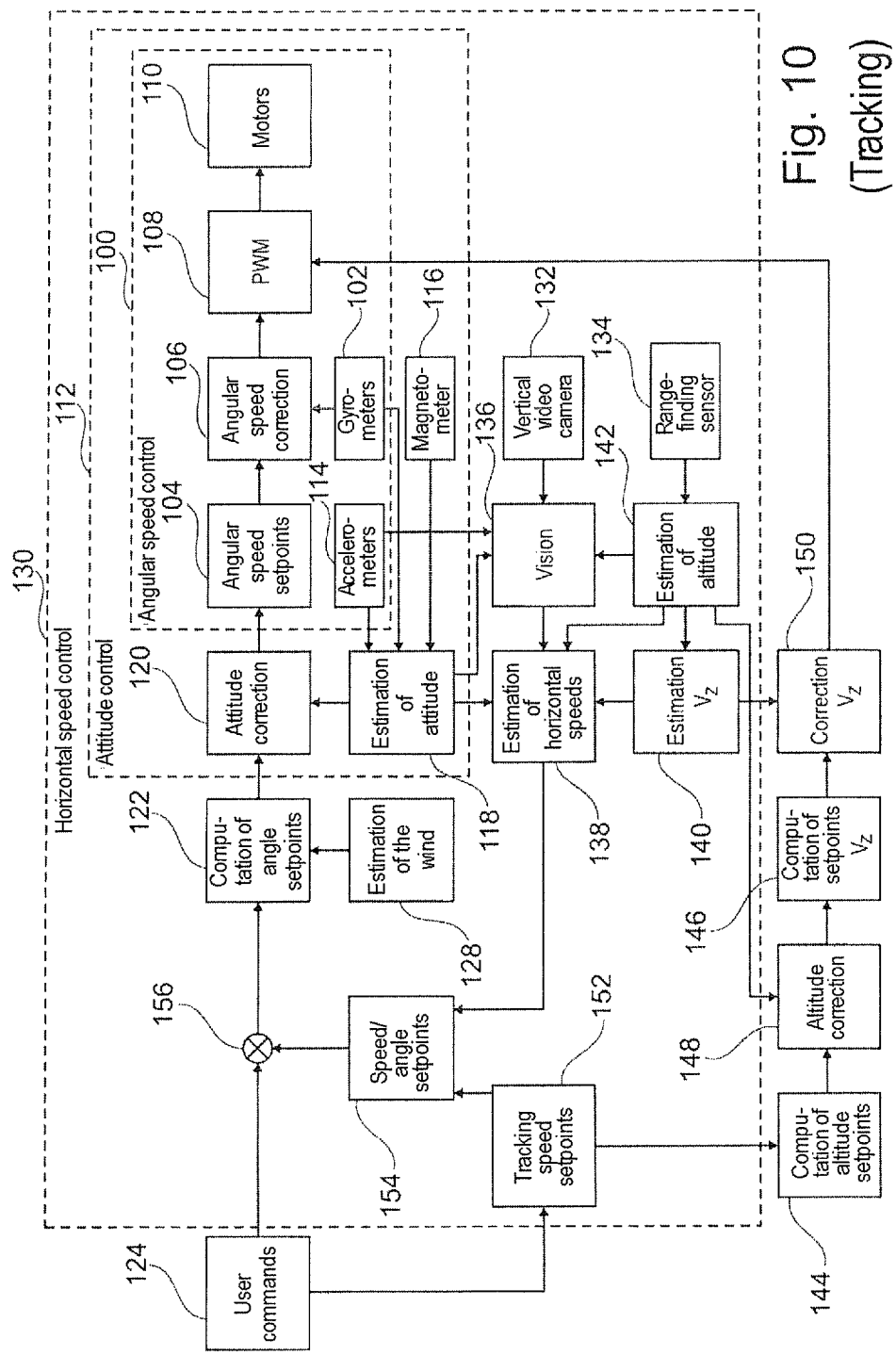
FIG. 10 is a diagram corresponding to that of FIG. 9, modified for an autopiloting configuration in tracking mode.

FIGS. 10 to 12 illustrate the modifications made to this conventional diagram to operate the exposures in stabilized mode according to the invention, respectively for a tracking, a panoramic exposure and a boom plane mode.

It will be noted that, although these diagrams are represented in the form of interconnected circuits, the implementation of the different functions is essentially software, and this representation is purely illustrative.

Generally, as illustrated in FIG. 9, the piloting system involves a plurality of nested loops for the control of the horizontal speed, of the angular speed and of the attitude of the drone, in addition to the control of the altitude variations automatically or under the effect of a command from the user.

The most central loop, which is the loop 100 for controlling the angular speed, uses on the one hand the signals supplied by the gyrometers 102 and on the other hand a reference consisting of angular speed setpoints 104. These different information items are applied as input to an angular speed correction stage 106, which itself pilots a stage 108 for controlling the motors 110 in order to separately control the speed of the different motors to correct the angular speed of the drone by the combined action of the rotors driven by these motors.

The angular speed control loop 100 is nested in an attitude control loop 112, which works on the basis of indications supplied by the gyrometers 102, by accelerometers 114 and by a magnetometer 116 giving the absolute orientation of the drone in a terrestrial geomagnetic reference frame. The data obtained from these different sensors are applied to an attitude estimation stage 118 of PI (Proportional-Integral) type. The stage 118 produces an estimation of the real attitude of the drone, applied to an attitude correction stage 120 which compares the real attitude to angle setpoints generated by a circuit 122 from commands directly applied by the user 124 and/or data generated internally by the automatic pilot of the drone via the horizontal speed correction circuit 126. The setpoints, possibly corrected, applied to the circuit 120 and compared to the real attitude of the drone, are transmitted by the circuit 120 to the circuit 104 to control the motors appropriately.

To sum up, from the error between the setpoint (applied by the user and/or generated internally) and the measurement of the angle (given by the attitude estimation circuit 118), the attitude control loop 112 computes an angular speed setpoint using the PI corrector of the circuit 120. The angular speed control loop 100 then computes the difference between the preceding angular speed setpoint and the angular speed actually measured by the gyrometers 102. The loop uses this information to compute the different rotation speed setpoints (and therefore lift force setpoints), which are sent to the motors 110 to produce the maneuver requested by the user and/or scheduled by the automatic pilot of the drone.

The circuit 122 for computing angle setpoints also receives corrections from a wind estimation circuit 128, the role of which will be described below in the case of executing a stabilized exposure.

The horizontal speed control loop 130 also comprises a vertical video camera 132 and a rangefinding sensor 134 serving as altimeter. A circuit 136 handles the processing of the images produced by the vertical camera 132, in combination with the signals from the accelerometer 114 and from the attitude estimation circuit 118, to produce data making it possible to obtain an estimation of the horizontal speeds according to the two pitch and roll axes of the drone, by means of a circuit 138. The estimated horizontal speeds are corrected by the vertical speed estimation given by a circuit 40 and by an estimation of the altitude value, given by the circuit 142 from information from the rangefinding sensor 134. With regard to the vertical displacements of the drone, the user 124 applies commands to a circuit for computing attitude setpoints 144, setpoints which are applied to a circuit for computing lift speed setpoints $V_z$ 146 via the altitude correction circuit 148 receiving the estimated attitude value given by the circuit 142. The lift speed $V_z$ computed is applied to a circuit 150 which compares this setpoint speed to the corresponding speed estimated by the circuit 140 and accordingly modifies the control data for the motors (circuit 108) so as to increase or reduce the rotation speed simultaneously on all the motors so as to minimize the difference between the setpoint lift speed and measured lift speed.

There now follows an explanation of how the control setpoints of the drone are generated by means of these circuits.

The drone speed data will be considered in a reference frame linked to the body of the drone, namely the reference frame {u, v, w} illustrated in FIG. 1.

The following notations are used:
u for the component of the horizontal speed of translation in the line of the main axis of the drone (along the roll axis 24);
v for the component of the horizontal speed of translation in the transversal line along the pitch axis 22); and
w for the vertical speed of translation,
all within a reference frame linked to the drone, and therefore independent of the inclination thereof in relation to the reference terrestrial reference frame.

Each of the four propellors i of the drone (i=1 ... 4) exerts a torque Γi and a lift thrust force $F_i$ proportional to the square of the speed of rotation $\omega_i$ of the motor:

$$\begin{cases} F_i = a\omega_i^2 \\ \Gamma_i = b\omega_i^2 \end{cases}$$

The fundamental dynamic relationship is applied, in projection into the mobile reference frame of the drone, which gives the following three equations:

$$\dot{u} = (rv - qw) - g\sin\theta - C_x u$$
$$\dot{v} = (pw - ru) + g\sin\varphi\cos\theta + C_y v$$
$$\dot{w} = (qu - pv) + g\cos\varphi\cos\theta - \frac{1}{m}\sum_{i=1}^{4} a\omega_i^2$$

(equations 1-3)

p, q and r being the angular speeds on the three axes,
g being the acceleration of gravity,
φ and θ being the two angles defining the inclination of the drone in relation to the horizontal (Euler angles),
$C_x$ and $C_y$ being the coefficients of resistance to advance (reflecting the friction forces undergone by the drone) in the two horizontal axes,
a being a coefficient linking the thrust and the lift speed to the rotation speed ω, and
m being the weight of the drone.

In the same way, the dynamic moment theorum is applied to the system, still in projection into the mobile reference frame, which leads to the following three equations:

$$I_x \dot{p} + qr(I_z - I_y) = la(\omega_2^2 - \omega_4^2)$$
$$I_y \dot{q} + pr(I_x - I_z) = la(\omega_1^2 - \omega_3^2)$$
$$I_z \dot{r} + pq(I_y - I_x) = b(\omega_1^2 - \omega_2^2 + \omega_3^2 - \omega_4^2)$$

(equations 4-6)

$I_x$, $I_y$ and $I_z$ being parameters representative of the coefficient of inertia of the drone in the three axes, and l being the distance separating the motor from its center of gravity.

In these equations, the first term of the left-hand member corresponds to the dynamic moment of the system, the second term represents the contribution to the dynamic moment of the Coriolis forces, and the right-hand member corresponds to the moments exerted by the lift forces $F_i$ and the torques $\Gamma_i$ created by the propellers of each of the rotors.

Finally, the following relationship is demonstrated, involving the three Euler angles φ, θ and ψ:

$$\dot{\varphi} = p + (q\sin\varphi + r\cos\varphi)\tan\theta$$
$$\dot{\theta} = q\cos\varphi - r\sin\varphi$$
$$\dot{\psi} = \frac{q\sin\varphi + r\cos\varphi}{\cos\theta}$$

(equations 7-9)

The behavior of the system is therefore described in total by nine equations and nine unknowns.

In the vicinity of the point of equilibrium, with the drone buoyant horizontally (zero speed and inclination), the following applies:

$$u=v=w=\theta=\phi=0$$

The equations 1-9 become:

$$g = \frac{1}{m}\sum_1^4 a\omega_i^2,$$

$$p = q = r = 0,$$

$$\omega_1 = \omega_3,$$

$$\omega_2 = \omega_4,$$

$$\omega_1 = \omega_2$$

And therefore, in the vicinity of the point of equilibrium:

$$\omega_1 = \omega_2 = \omega_3 = \omega_4 = \frac{1}{2}\sqrt{\frac{mg}{a}} = \omega_0$$

By positing $w_i=\omega_1-\omega_0$ with i=1 ... 4, and linearizing to the first order the preceding equations about the point of equilibrium, the following system of linearized equations is obtained:

$$\begin{cases} \dot{u} = -g(\theta) - Cx*u & \text{(equations 10-18)} \\ \dot{v} = g(\varphi) + Cy*v \\ \dot{w} = -\dfrac{2a\omega_0}{m}(w_1+w_2+w_3+w_4) \\ \dot{p} = \dfrac{la\omega_0}{I_x}(w_2-w_4) \\ \dot{q} = \dfrac{la\omega_0}{I_y}(w_1-w_3) \\ \dot{r} = \dfrac{b\omega_0}{I_z}(w_1+w_3-w_2-w_4) \\ \dot{\varphi} = p \\ \dot{\theta} = q \\ \dot{\psi} = r \end{cases}$$

Exposure in Tracking Mode

FIG. 10 illustrates the modifications made to the diagram of FIG. 9 for the execution of the exposure in stabilized tracking mode (or in stabilized fixed plane mode, for a zero speed setpoint).

The tracking speed setpoints applied to a circuit 152 by the user are converted into angular setpoints by a circuit 154 also receiving the horizontal speed values estimated by the circuit 138. These setpoints comprise the plus or minus high speed value, as well as the direction (according to u or else according to v) and the direction of displacement along the chosen line.

The angular setpoints computed by the circuit 154 are applied directly as input for the circuit 122, these setpoints possibly being superimposed in 156 on commands applied by the user, inasmuch as he is allowed to make corrections to the trajectory of the tracking during the execution thereof.

In practice, because the drone is piloted in closed loop mode, it is locked angle-wise, but in relation to the trajectory, it can deviate strongly, for example if the wind is variable. It is therefore desirable, throughout the exposure phase with closed-loop mode control, for the user to be able to supervise the flight:

either by abandoning the trajectory and resuming manual piloting, or by superimposing slight corrections superimposed on the setpoints of the closed loop. These slight corrections may make the image shake, but it is important for the user, who is also the exposure operator, to be able to choose what he prefers at any time: either a fixed image and a trajectory which deviates, or a movement of the image and a more faithful trajectory (which is very useful in particular for tracking).

It will be noted that the trajectory setpoints are directly applied as input for the circuit 122 in open loop mode, the horizontal speed correction circuit 126 of FIG. 9 here being deactivated so as not to produce oscillations around a setpoint position under the influence of speed servocontrol.

This makes it possible to minimize the movements angle-wise (which are normally inherent in the speed servocontrol of a quadricopter) in order not to have too much movement in the image. In other words, to stabilize the image, slight variations in the speed of horizontal displacement during the trajectory of the tracking will be accepted, by eliminating the slight oscillations about the pitch and/or roll axes which otherwise would interfere strongly with the image picked up by the camera.

More specifically, after having chosen the desired line and direction of the tracking movement, a setpoint speed $Vx_{ref}$=constant or else $VyY_{ref}$=constant is recovered from the user.

To take the example of a movement in the plane along the main axis of the drone, that is to say along the axis Δ of the camera (corresponding to a forward tracking), the following will apply:

$$\dot{u}=-g(\theta)-Cx*u$$

For an angle θ such that θ<30°, the following approximated relationship can be used:

$$V_{xhorz}=-g(\theta)-Cx*V_{xhorz}$$

During a period of transitional operation, $V_{xhorz}$ will converge toward its final value. The duration of this transitional period is in practice of the order of 1 to 2 seconds, a value much lower than the usual duration of an exposure in tracking mode. To rapidly arrive at an almost stabilized operation, during this period of transitional operation, the drone will be operated in closed loop mode (therefore without seeking to minimize the movements angle-wise), and the actual exposure will be started only when the setpoint speed has been reached.

In permanent operation (corresponding to the configuration of FIG. 10, with minimization of the angular movements), the equation becomes:

$$0=-g(\theta)-Cx*V_{xhorz}$$

This means that in permanent operation, at constant speed, the pitch angle θ should be constant.

The angular reference sent to the angle control loop is therefore the speed reference, transformed by the above relationship, and done so in open loop mode to avoid the oscillation movements that are prejudicial to the quality of the image picked up.

Because of this absence of closed loop mode servocontrol, it may be advantageous to compensate the external disturbances (modeled by a constant wind), or more specifically the projection of the speed vector of the wind onto the displacement axis of the trajectory. This correction is applied by the circuit 128. The external disturbances modeled by a constant wind in the line of the movement can be expressed by:

$$V_{xhorz_{air}} = -g(\theta) - Cx * V_{xhorz_{air}}$$

Since $V_{ground} = V_{air} - V_{wind}$, it follows that $Y_{xhorz_{wind}} = 0$ in the wind (assumption of constant wind over the duration of the exposure), hence:

$$V_{xhorz_{ground}} = -g(\theta) - Cx * V_{xhorz_{ground}} - Cx * V_{xhorz_{wind}}$$

When in permanent operation the effect of this component is eliminated by adapting the angle reference as follows:

$$\theta_{ref}(k) = -\frac{Cx}{g} * V_{xhorz_{ref}} + \theta_{correction}(k)$$

with:

$$\theta_{correction}(k) = \theta_{correction}(k-1) + K * (V_{xhorz_{ref}} - V_{xhorz_{mes}}(k))$$

Advantageously, to limit the movements angle-wise linked to the control, as soon as the speed error passes below a predetermined threshold, the compensation term is fixed at a constant value throughout the exposure. Another possibility is to choose the value of the gain K such that the corresponding additive term changes only very slowly in relation to the dynamics of the drone, for example over ten or so seconds.

Exposure in Panoramic Mode

FIG. 11 illustrates the modifications made to the scheme of FIG. 9 for the execution of the exposure in panoramic mode.

The parameters defined by the user comprise angular speed setpoints for the progress of the panoramic exposure, applied by a circuit 158 directly to the circuit 104 of the angular speed control loop, and a possible altitude setpoint (altitude to be reached by the drone, and from which the panoramic exposure will be triggered), applied to an altitude setpoint circuit 160.

Here again, in the same way as was explained for the tracking mode, the user can be allowed the possibility of superimposing, during the exposure, horizontal displacement commands, applied to the circuit 12, and/or altitude correction commands, superimposed in 162 on the setpoints delivered by the circuit 160.

The circuit 160 directly applies the parameterized setpoints to the circuit 144 for computing altitude setpoints.

Here again, the circuit 126 (which can be seen in FIG. 9) for correcting the horizontal speed is deactivated, so as to minimize the oscillation movements about the pitch and roll axes.

To perform the panoramic exposure, the drone operates simply with the following setpoints:

$$\begin{pmatrix} \theta_{ref} \\ \varphi_{ref} \\ \psi_{ref} \\ r_{ref} \end{pmatrix} = \begin{pmatrix} 0 \\ 0 \\ \psi_{current} \\ \text{constant} \end{pmatrix}$$

In other words, the speed servocontrol is disconnected, the roll and pitch setpoints are zero, and the rotation setpoint about the yaw axis is a setpoint of rotation at constant angular speed.

As in the preceding case, it is possible to provide a permanent correction of the external disturbances modeled by a constant wind.

According to another aspect of the invention, the panoramic mode can be used to generate a succession of fixed exposures which will then be connected together to give a 360° panorama of the scene around the drone.

In this case, the movement of the drone is no longer a continuous rotational movement about a vertical axis, but a movement by successive steps between angularly offset fixed points, defined by a heading reference incremented after each exposure. The rotation pitch is obviously chosen to ensure a sufficient overlap between the successive fixed views. A constraint specific to this type of exposure is that fact that the rotation is performed about a vertical axis passing through the input aperture of the camera and no longer the yaw axis of the drone, to avoid geometrical deformations which would not allow for a satisfactory connection of the successive images, given the relatively great difference between these two axes (of the order of 15 cm).

The rotational movement about a vertical axis must then be completed by a horizontal linear displacement. The necessary setpoints are computed by a circuit 164 from yaw angular speed setpoints generated by the circuit 158 and from the attitude estimation given by the circuit 118. The result is delivered to a horizontal linear speed correction circuit 166, which also receives the estimation of the horizontal speeds given by the circuit 138 and generates the necessary setpoints, applied via 168 to the circuit 122 for computing pitch and roll angular setpoints.

More specifically, it is good practice to produce commands enabling the drone to follow, in the horizontal plane, a circular trajectory centered on the input aperture of the camera, that is to say transmit to the drone a speed along the axis v of the drone, an axis oriented tangentially in relation to this trajectory.

The setpoint of speed of advance tangential to the circle sent to the speed servocontrol loop, denoted $Vy_{ref}$, is deduced directly from the setpoint of angular speed of rotation about the vertical axis given by the user.

For a uniform rotational trajectory about a fixed center, the following applies:

$$V = \dot{\psi} * R$$

V being the tangential speed (lateral speed on the axis v of the drone), $\dot{\psi}$ being the angular speed of the drone, and R being the radius of the circle, that is to say the offset between the yaw axis (vertical axis passing through the center of inertia of the drone) and the vertical axis passing through the aperture of the camera.

The angular speed is given by the following expression:

$$\dot{\psi} = \frac{q \sin\varphi + r\cos\varphi}{\cos\theta} \cong \frac{r * \cos\varphi}{\cos\theta}$$

The command sent is then given by:

$$\begin{pmatrix} Vy_{ref} \\ Vx_{ref} \\ r_{ref} \end{pmatrix} = \begin{pmatrix} \dot{\psi} * R \\ 0 \\ \text{constant} \end{pmatrix} = \begin{pmatrix} \frac{r_{measured} * \cos\varphi}{\cos\theta} * R \\ 0 \\ \text{constant} \end{pmatrix}$$

Thus, the user chooses a speed of rotation about the axis of the front-mounted camera, from which is deduced a setpoint speed of advance along the axis v of the drone.

The drone then describes a circle centered on the input aperture of the camera, at the rotation speed desired by the user.

Exposure in Boom Mode

FIG. 12 illustrates the modifications made to the scheme of FIG. 9 for the execution of the exposure in boom mode.

The position setpoints X, Y, Z defining the line of the trajectory are applied by the user to a circuit 170 then to a position correction circuit 172 comparing the setpoint position to the measured real position, produced by a position estimation circuit 174. The setpoints obtained from the circuit 172 are possibly superimposed in 176 on commands applied directly by the user, if the latter is allowed the facility to make, during the exposure, modifications to the preprogrammed trajectory.

Here again, it will be noted that the horizontal speed correction circuit 126 of FIG. 9 is deactivated, the control operating in open loop mode so as to minimize the oscillation movements of the drone about the roll and pitch axes.

The command produced is an angle command, computed from the position difference between the reference and the current position so that the speed is constant along the trajectory:

$$\begin{pmatrix} X_{ref} \\ Y_{ref} \\ Z_{ref} \end{pmatrix} = \begin{pmatrix} \text{constant} \\ \text{constant} \\ \text{constant} \end{pmatrix}$$

The principle of the control is the same as that of the tracking mode, with simultaneous displacements in the two horizontal directions at one and the same time and also in the vertical direction:

for the horizontal movements, the constant speed setpoint parameterized by the user is converted into angular commands, with, possibly, compensation of the external disturbances (constant wind), in order to minimize the movements of the camera;

for the vertical movements, the climb or descent speed is defined independently of the horizontal speeds, from the maximum speed value chosen by the user, so as to reach the point (X,Y,Z) parameterized by the user as rapidly as possible. When the current position is close to the desired position, the control is deactivated and the exposure in boom plane mode can then commence, at constant speed in the predefined line and entirely automatically.

The invention claimed is:

1. A method for piloting, by means of a remote control apparatus, a rotary wing drone with multiple rotors driven by respective motors that can be controlled in a differentiated manner to pilot the drone attitude-wise and speed-wise, wherein horizontal displacements of said drone result from angular tilting movements about roll and pitch axes, said drone comprising a processing subsystem for piloting the drone attitude-wise and speed-wise by servocontrols, said servocontrols including a horizontal speed control including a closed-loop, the drone further comprising an onboard video camera suitable for picking up a sequence of images of a target seen from the drone and for transmitting this sequence to the apparatus, characterized by the following steps:

selection by the user of a predetermined exposure mode, defined by a set of parameters describing a translational trajectory to be transmitted to the drone, these parameters comprising:
exposure mode in displacement;
a constant, non-zero speed of displacement;
direction of displacement;
orientation of displacement;
duration of displacement; and
exposure altitude;

generation of setpoint values from said set of parameters, and application of these setpoints to said processing subsystem for controlling the motors of the drone; and once the drone is stabilized on a translational trajectory conforming to said parameters, activation of the exposure by the video camera, wherein said activation of the exposure by said video camera includes activation of a trajectory-stabilization mode including a selective modification of said servocontrols as a function of said predetermined exposure mode selected by the user, said modification including a deactivation of said closed-loop of said horizontal speed control once said constant, non-zero speed of displacement has been reached, whereby minimizing stray oscillations resulting from said angular tilting movements about roll and pitch axes.

2. The method of claim 1, in which:
the exposure mode is a forward or sideways tracking mode, and
the set of parameters is suitable for describing a translational trajectory with constant speed of displacement along a horizontal direction, this horizontal direction being parallel to the axis (Δ) of the camera for a forward tracking and at right angles to the axis (Δ) of the camera for a sideways tracking,
the trajectory being oriented toward the front or rear for a forward tracking, and toward the left or toward the right for a sideways tracking.

3. The method of claim 2, in which the setpoint values are generated in the form of angular setpoints according to a pitch angle of the drone for a forward tracking, or according to a roll angle of the drone for a sideways tracking, these angular setpoints being applied:
during a transitional phase: to the processing subsystem configured in a horizontal speed servocontrol closed loop suitable for enabling the drone to reach said parameterized displacement speed, then
once the displacement speed is reached: to the processing subsystem configured in a horizontal speed control open loop, with deactivation of said servocontrol closed loop.

4. The method of claim 2, in which the generation of setpoints comprises the generation of additional setpoints representative of a horizontal speed compensating the component of the wind in the direction of displacement of the drone.

5. The method of claim 4, in which said additional setpoints are fixed at a constant value when the horizontal speed servocontrol error passes below a predetermined threshold.

6. The method of claim 1, in which:
the exposure mode is a boom plane mode wherein the boom plane mode gives an illusion of the camera attached to an end of a boom, and
the set of parameters is suitable for describing a translational trajectory at constant speed, in one direction or in the other, along a direction forming an angle with the plane of the horizontal.

7. The method of claim 6, in which the setpoint values are applied:
during a transitional phase: to the processing subsystem configured in a speed servocontrol closed loop, suitable for enabling the drone to reach the speed of displacement and follow said direction of displacement by generation of angular setpoints according to pitch and roll angles of the drone, then
once the speed of displacement and the direction of displacement have been reached: to the processing subsystem configured in a speed control open loop, with deactivation of said servocontrol closed loop.

8. The method of claim 1, also comprising:
the application by the user of trajectory correction commands, superimposed on said setpoint values generated from said set of parameters.

9. The method of claim 4 wherein when a speed error passes below a predetermined threshold, a compensation term of the horizontal speed is fixed at a constant.

10. The method of claim 4 wherein said subprocessing system estimates the wind, computes an average angle for fighting against the wind, and when the exposure mode is triggered, said subprocessing system applies the average angle to the setpoints of the drone.

11. The method of claim 1 wherein the setpoints are directly applied as input in open loop mode, and a horizontal speed correction circuit is deactivated to prevent oscillations around a setpoint position.

\* \* \* \* \*

UNITED STATES PATENT AND TRADEMARK OFFICE
CERTIFICATE OF CORRECTION

PATENT NO. : 9,563,200 B2
APPLICATION NO. : 13/733386
DATED : February 7, 2017
INVENTOR(S) : Michael Rischmuller et al.

Page 1 of 1

It is certified that error appears in the above-identified patent and that said Letters Patent is hereby corrected as shown below:

In the Specification

Column 10 at Line 56; the phrase "involving the three Euler angles φ, θ and φ" should read -- involving the three Euler angles φ, θ and Ψ --.

Column 13 at Line 10; the equation "Yxhorzwind = 0" should read -- Vxhorzwind = 0 --.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*